(12) United States Patent
Alrabady et al.

(10) Patent No.: US 7,679,500 B2
(45) Date of Patent: Mar. 16, 2010

(54) WIRELESS SENSING SYSTEM

(75) Inventors: Ansaf I. Alrabady, Livonia, MI (US);
Michael B. Ames, Lake Orion, MI (US);
Timothy J. Talty, Beverly Hills, MI (US)

(73) Assignee: GM Global Technology Operations, Inc., Detroit, MI (US)

( * ) Notice: Subject to any disclaimer, the term of this patent is extended or adjusted under 35 U.S.C. 154(b) by 525 days.

(21) Appl. No.: 11/468,792

(22) Filed: Aug. 31, 2006

(65) Prior Publication Data

US 2007/0096889 A1 May 3, 2007

Related U.S. Application Data

(60) Provisional application No. 60/713,924, filed on Sep. 2, 2005.

(51) Int. Cl.
*B60C 23/00* (2006.01)
(52) U.S. Cl. .................................. 340/447; 340/572.1
(58) Field of Classification Search ................. 340/447, 340/10.1, 572.1; 701/79, 38–39
See application file for complete search history.

(56) References Cited

U.S. PATENT DOCUMENTS

| | | | |
|---|---|---|---|
| 5,463,374 A | 10/1995 | Mendez et al. | |
| 5,745,083 A | 4/1998 | Uematsu et al. | 343/771 |
| 5,973,647 A | 10/1999 | Barrett et al. | 343/713 |
| 6,748,799 B2 | 6/2004 | Fischer et al. | 73/146.5 |
| 2002/0177406 A1* | 11/2002 | O'Connor et al. | 455/334 |
| 2004/0043747 A1* | 3/2004 | Forster | 455/334 |
| 2006/0111829 A1* | 5/2006 | Williams | 701/79 |
| 2006/0229103 A1* | 10/2006 | Monk | 455/562.1 |

\* cited by examiner

*Primary Examiner*—Daniel Wu
*Assistant Examiner*—Shirley Lu

(57) ABSTRACT

A wireless vehicular sensing system is disclosed. The wireless sensing system may include a radio frequency access control system including a plurality of antennas distributed within the vehicle and at least one radio frequency transceiver coupled to the plurality of antennas for effecting radio frequency interrogations of radio frequency access permission devices via the plurality of antennas in response to operator invoked interrogation requests, and a plurality of radio frequency sensors distributed within the vehicle and associated with systems other than vehicle access control. The at least one radio frequency transceiver effects radio frequency interrogations of the plurality of radio frequency sensors via the plurality of antennas in response to system invoked interrogation requests. The wireless sensing system may include a radio frequency tire monitoring system including a plurality of antennas distributed within the vehicle and at least one radio frequency transceiver coupled to the plurality of antennas for effecting radio frequency interrogations of tire monitor devices via the plurality of antennas in response to tire monitor device invoked interrogation requests, a plurality of radio frequency sensors distributed within the vehicle and associated with systems other than tire monitoring. The at least one radio frequency transceiver effects radio frequency interrogations of the plurality of radio frequency sensors via the plurality of antennas in response to system invoked interrogation requests.

19 Claims, 4 Drawing Sheets

● Sensors 11

● Sensors 11

● Sensors 11

● Sensors 11

● Sensors 11

WIRELESS SENSING SYSTEM

CROSS REFERENCE TO RELATED APPLICATIONS

This application claims priority from U.S. Provisional Application Ser. No. 60/713,924 filed Sep. 2, 2005.

TECHNICAL FIELD

The present invention is related to sensors and switches. More particularly, the invention is concerned with wireless sensors and switches.

BACKGROUND OF THE INVENTION

Devices and systems are known for enabling secure, keyless access control including vehicular access control. An authorized person possesses a radio frequency (RF) device, for example an RF identification (ID) tag embedded in an identification badge or credit card-type medium to enable access. Building access systems may rely upon swiping the badge or card through an energizer/reader which interrogates the RFID tag and verifies that certain information carried by the RFID tag meets the security requirements to allow access. Similarly, a vehicular access control system may rely upon door handle activation to initiate an interrogation and verification. If the door handle operator possesses a key, a key fob, badge, card or the like including an RFID tag with information meeting the security requirements, the door locks are actuated to provide access to the vehicle. Additional interrogation may enable operative functionality of the vehicle systems, including keyless push-button starting, in similar fashion. Related RF based systems are in use for authorizing purchases where small RF devices intended primarily for coupling to a key chain are brought into proximity of an RF energizer/reader associated with a dispensing mechanism for the product being purchased. In such systems, the RF device stores information related to the user's credit card account for completing the transaction. Other systems are known for automating the collection process on toll roads where an RF device carried by a vehicle is interrogated and communicates information back to an RF energizer/reader associated with certain designated toll collection booths.

Passive wireless devices (i.e. those requiring interrogation before transmission) may be categorized as backscatter type which reflects back a characteristic signal to the energizer/reader subsequent to the energizer/reader sending an interrogation signal. The energizer/reader can identify and distinguish unique backscatter signatures. This type of wireless system is generally a lowest cost approach. Another type of wireless system receives the interrogation signal, rectifies the RF energy to a DC source and uses the DC energy to send information stored in sensor memory. Another type has its own power source—commonly a battery. The battery may be completely independent of the RF energizer/reader energy or alternatively recharged by the RF energizer/reader signal. In both of these latter wireless systems, the RF signal serves to interrogate or wake up the wireless device. Such wireless devices use the interrogation signal for initiating the provision of stored information back to the energizer/reader.

Electromagnetic emissions are regulated. Such regulations limit the RF energy emitted by an energizer/reader in the frequency band where RF devices operate. Current United States regulations limit such energy emissions to 4 watts. Similar regulations exist in other countries around the world. Such energy restrictions effectively limit the effective range between the energizer/reader and the RF device.

The communication links of an RF system including an energizer/reader and remote RF device are not balanced. That is to say, the energizer/reader emits a relatively greater amount of RF energy than does the RF device. The energizer/reader must be located close enough to the RF device to effectively energize and/or interrogate the RF device to effect the desired return response from the device. If too far away from the energizer/reader, or in an area of attenuated RF signal, the RF responsive device will not receive enough energy to backscatter, to appropriately energize and effect a response, or to distinguish the energizer/reader emission as an interrogation looking for a response.

RF device communication systems are generally limited due to regulations. Beginning with the forward communication link power limitation, losses in communicating to the RF device include propagation losses, RF device antenna inefficiencies and losses in the energy and signal conversions for signal processing and energy utilization at the RF device. And, these same types of inefficiencies are repeated within the RF device in the reverse communication link from the RF device to the energizer/reader. The remaining reverse communication link, which includes the energizer/reader front end and digital signal processing, however, is more robust being characterized by effective noise immunity and the ability to detect relatively low level signals. Therefore, RF device communication systems are generally more limited with respect to the forward communication link than with respect to the reverse communication link.

Effective systems therefore require designed proximity and orientation between the energizer/reader and the RF device to ensure proper operation. In conventional applications, the energizer/reader and the RF device are dynamically manipulated such that the proximity and orientation requirements for effecting the desired interaction are met. This may include, for example, manipulating the RF device into an appropriate position relative to a static energizer/reader, manipulating the energizer/reader into an appropriate position relative to a static RF device or combinationally manipulating the RF device and the energizer/reader into an appropriate cooperative orientation. Such systems are used, for example, in inventory management control and product tracking. One such system may convey goods carrying an RF device along a defined path which includes an energizer reader oriented such that the conveyance brings the RF device within the proper proximity and orientation of the energizer/reader to effect the desired operation. Another such system may make use of a portable or maneuverable energizer/reader for spot checking material at various ad-hoc locations within a distribution chain—for example at a receiving dock, a warehouse or just about anywhere within a distribution chain—by maneuvering the energizer/reader within the proper proximity and orientation of the RF device to effect the desired operation. These systems tend to be characterized by relatively narrow interrogation fields relative to the energizer/reader within which the RF device can be made to, or is reasonably anticipated to, temporally but sufficiently reside to effect the desired interrogation. These systems are not generally concerned with wide range interrogation fields which, in fact, might undesirably initiate unintentional interrogations of RF devices away from the intended RF device thereby complicating energizer/reader tasks associated with intelligibly discerning return signals.

SUMMARY OF THE INVENTION

A wireless vehicular sensing system includes a radio frequency access control system including a plurality of antennas distributed within the vehicle and at least one radio frequency transceiver coupled to the plurality of antennas for effecting radio frequency interrogations of radio frequency access permission devices via the plurality of antennas in response to operator invoked interrogation requests, and a plurality of radio frequency sensors distributed within the vehicle and associated with systems other than vehicle access control. The at least one radio frequency transceiver effects radio frequency interrogations of the plurality of radio frequency sensors via the plurality of antennas in response to system invoked interrogation requests.

A wireless vehicular sensing system includes a radio frequency transceiver, a plurality of antennas coupled to the radio frequency transceiver, a radio frequency access permission device including a radio frequency transponder, and a radio frequency sensor including a radio frequency transponder. The radio frequency transceiver interrogates the radio frequency access permission device in response to an operator invoked interrogation request and the radio frequency transceiver interrogates the radio frequency sensor in response to system invoked interrogation requests.

A wireless vehicular sensing system includes a radio frequency transceiver, a plurality of antennas coupled to the radio frequency transceiver, a first radio frequency sensor effective to transmit data upon predefined events determined by the first radio frequency sensor, and a second radio frequency sensor including a radio frequency transponder. The radio frequency transceiver receives radio frequency transmissions from the first radio frequency sensor and the radio frequency transceiver interrogates the second radio frequency sensor in response to system invoked interrogation requests.

A wireless vehicular sensing system includes a radio frequency tire monitoring system including a plurality of antennas distributed within the vehicle and at least one radio frequency transceiver coupled to the plurality of antennas for effecting radio frequency interrogations of tire monitor devices via the plurality of antennas in response to tire monitor device invoked interrogation requests. The wireless vehicular sensing system further includes a plurality of radio frequency sensors distributed within the vehicle and associated with systems other than tire monitoring. The at least one radio frequency transceiver effects radio frequency interrogations of the plurality of radio frequency sensors via the plurality of antennas in response to system invoked interrogation requests.

These and other aspects of the invention will become apparent to those skilled in the art upon reading and understanding the following detailed description and drawings of certain exemplary embodiments.

DESCRIPTION OF THE PREFERRED EMBODIMENT

Figure 1:
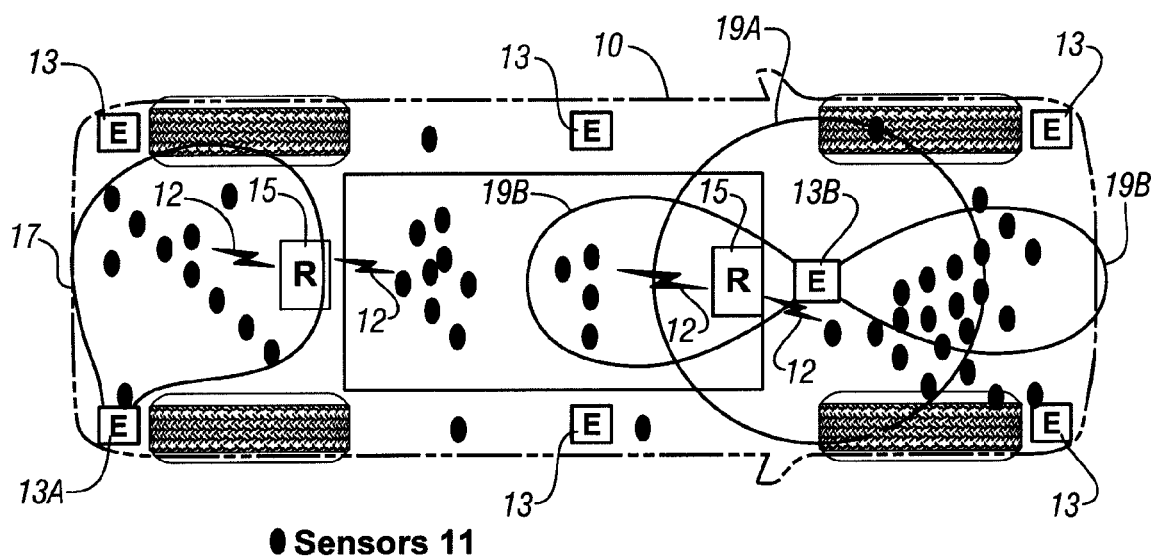
FIG. 1 illustrates a vehicular application of a wireless sensing system employing separate wireless energizers and readers in the forward and reverse communication links in accordance with the present invention.

A first embodiment of a wireless sensor system in accordance with the present invention is exemplified in a vehicular application illustrated with respect to FIG. 1. Other non-automotive environments and applications are fully within the scope of the present invention and the present automotive embodiment is to be understood to be offered by way of non-limiting example of the invention. A vehicle 10 includes a number of complex and diverse systems including sensors 11 for a variety of metrics related to various aspects of vehicle operation, including the non-limiting and non-exhaustive examples of engine controls, vehicle emissions and compliance, vehicle stability including suspension, steering and wheel braking/torque controls, vehicle and occupant security and occupant detection. Sensing includes non-limiting and non-exhaustive examples of sensing environmental metrics such as temperature, humidity, pressure, light and moisture, and component, system and vehicle level metrics related to linear and rotary positions, velocities and accelerations, etc. Sensors include, for example, transducers and switches and, in accordance with the present invention, some degree of smart sensing functionality at least to enable transformation of the sensed metrics into a form useful for wireless communication. For example, some signal processing in-situ (e.g. signal conditioning and filtering, analog-to-digital (A/D) conversion) is provided by the exemplary sensors. Additionally, sensors may be equipped with historical data buffering and associated time stamps. And, sensors are capable of wirelessly communicating the sensed and conditioned data, switch state or other state data when interrogated or at other times or in accordance with events as appropriate. Therefore, one skilled in the art will recognize that in addition to sensor and switch hardware, sensors 11 also include a radio frequency transponder. Such radio frequency functionality is generally well understood and its implementation with sensors within the capabilities of one having ordinary skill in the art. Such sensors 11 may be further referred to herein as RF sensors.

One or more energizers (E) 13 are distributed strategically around the vehicle 10 and are effective to adequately energize the plurality of RF sensors 11 in accordance with their respective requirements (e.g. for effecting backscatter, device powering/charging and intelligible interrogation). Similarly, one or more readers (R) 15 are distributed strategically around the vehicle 10 and are effective to receive and process the variety of RF sensor data communicated wirelessly by the plurality of RF sensors 11 via air links 12. It is believed that, as a general system design premise, fewer readers (R) 15 than energizers (E) 13 would be required since the forward communication links are the more limited communication link as between the forward and reverse communication links due to the availability of highly sensitive and selective RF front-ends and digital signal processing. A number of conventionally combined energizer/readers (hereafter referred to herein as transceivers (E/R)) at least as great as the number of energizers (E) 13 in the present embodiment of the invention would be required to effect the same robust coverage of the present exemplary embodiment. Advantageously, however, the physical and functional separation of the energizers and readers in accordance with the present invention allows for fewer readers (R) 15 than energizers (E) 13 due to the general imbalance between the forward and reverse communication links which works to the benefit of readers. Also, physical and functional separation of the energizers and readers in accordance with the present invention enables better energy utilization of both the readers and the energizers in as much as the radiation patterns of each may be designed independent of the other. For example, a substantially single-lobed radiation pattern 17 of an energizer (E) 13A located at a vehicle corner is preferably designed to provide forward communication link coverage within the general confines of the vehicle 10 with significantly attenuated forward communication link radiation external to the vehicle as shown in FIG. 1. A substantially single-lobed radiation pattern 17 of an energizer located at a vehicle corner is preferably designed to provide forward communication link coverage within the general confines of the vehicle 10 with significantly attenuated forward communication link radiation external to the vehicle as shown in FIG. 1. And, a more centrally located energizer (E) 13B may be designed to provide either a more omni-directional radiation pattern 19A or, alternatively, a dual-lobed radiation pattern 19B for axial coverage substantially aligned longitudinally with respect to the vehicle center-line, both as shown in FIG. 1. With respect to a reader in accordance with the present invention, similar preferential radiation patterns advantageously may be designed such as, for example, a symmetrical dual-lobed pattern allowing for strategically locating the readers for effective coverage of the RF sensor transmissions in the reverse communication link.

Figure 2:
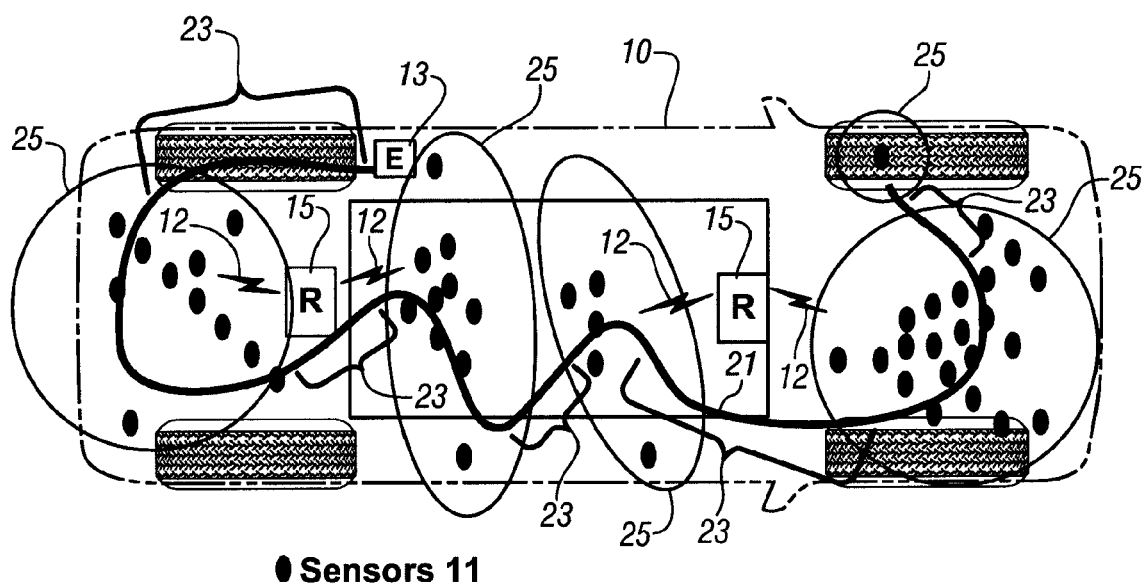
FIG. 2 illustrates a vehicular application of a wireless sensing system employing transmission cables in the forward communication link in accordance with the present invention.

With reference now to FIG. 2, an alternate embodiment of a wireless sensor system in accordance with the present invention is illustrated again with respect to an exemplary vehicular application. In this embodiment, one or more readers (R) 15 are distributed strategically around the vehicle 10 and are effective to receive and process the variety of RF sensor data communicated wirelessly by the plurality of RF sensors 11 via air links 12. One or more transmission cables 21 are routed through the vehicle 10 and more particularly and preferably in proximity to regions wherein RF sensors 11 are located. The transmission cables are traveling wave antennas configured with designed leak paths to control radiation characteristics (e.g. locations, magnitudes, cut-off frequencies and patterns) in accordance with well understood design principles of traveling wave and leaky waveguide antenna structures. One implementation merely requires standard shielded coaxial cable including designed regions of shielding removal to control radiation characteristics (e.g. locations, magnitudes, cut-off frequencies and patterns). The transmission cables are electrically coupled to an energizer (E) 13 effective to source the cable with RF energy as part of the forward communication link. Preferably, the coupling is through physical termination; however, near field coupling may be employed. Advantageously, radiated energy can be delivered and focused by selectively leaking the energy from the cable at strategic points along the cable to adequately energize the plurality of RF sensors 11 in accordance with their respective requirements (e.g. for effecting backscatter, device powering/charging and intelligible interrogation). This allows for efficient utilization of the energy by controllably radiating energy in regions requiring such radiation and by providing relatively lossless transmission of energy between such regions. Therefore, as exemplified in the embodiment illustrated in FIG. 2, transmission cable 21 includes fully shielded transmission runs 23 and slotted sensor coupling regions on either side thereof for effecting various radiation patterns 25 effective to adequately energize the plurality of RF sensors 11 in accordance with their respective requirements (e.g. for effecting backscatter, device powering/charging and intelligible interrogation).

Figure 3:
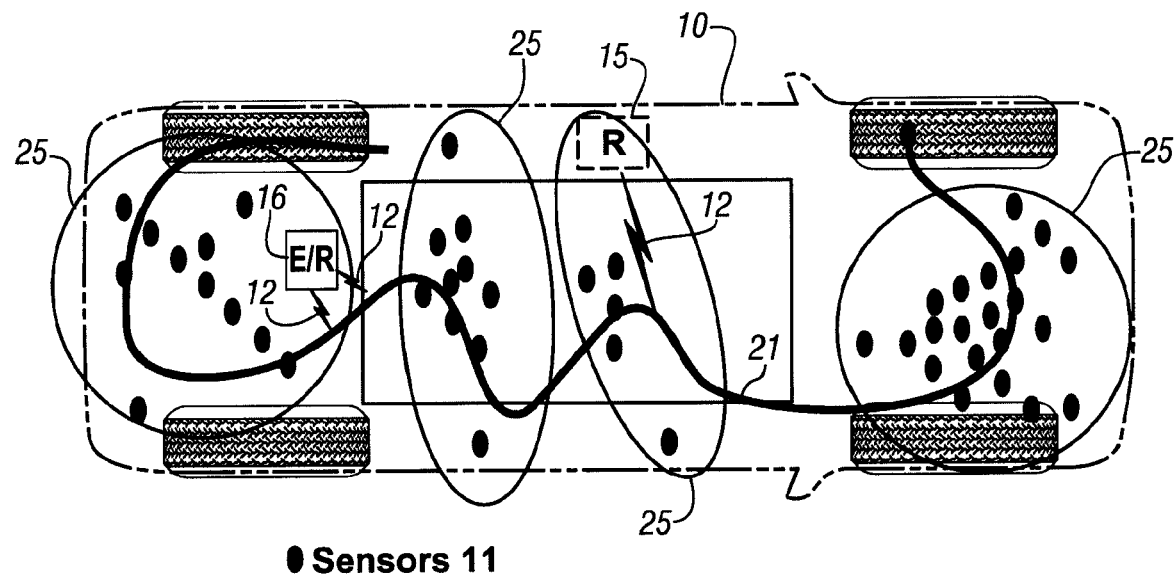
FIG. 3 illustrates a vehicular application of a wireless sensing system employing transmission cables in the communication links including near field coupling in accordance with the present invention.

With reference now to FIG. 3, an alternate embodiment of a wireless sensor system in accordance with the present invention is illustrated again with respect to an exemplary vehicular application. In this embodiment, one or more transmission cables 21 are routed through the vehicle 10 and more particularly and preferably in proximity to regions wherein RF sensors 11 are located. The transmission cables are traveling wave antennas configured with designed leak paths to control radiation characteristics (e.g. locations, magnitudes, cut-off frequencies and patterns). At least one transceiver (E/R) 16 is air link coupled, preferably near field coupled, to the transmission cables 21 and effective to source the cable with RF energy as part of the forward communication link. As in the embodiment illustrated with respect to FIG. 2, radiated energy is delivered and focused by selectively leaking the energy from the cable at strategic points along the cable (i.e. sensor coupling regions) to adequately energize the plurality of RF sensors 11 in accordance with their respective requirements (e.g. for effecting backscatter, device powering/charging and intelligible interrogation). Additionally, in the present exemplary embodiment, the near field coupling of the transceiver (E/R) 16 and transmission cables 21 are effective in the reverse communication link of the wireless sensing system. In this embodiment, the RF sensors are air linked to the one or more transmission cables 21 via the sensor coupling regions and the transmission cables 21 provide near field coupling of the RF sensor signals to the at least one transceiver (E/R) 16. Alternatively, the reverse link of the wireless sensing system may take advantage of the sensitivity benefits of readers in general with the transmission cable 21 air linking to an independent reader 15 as part of the reverse communication link. Preferably, the air link to the reader (R) 15 in such a configuration advantageously couples to the transmission cable 21 through a leak path associated with a radiation pattern 25 that also effects an air link to RF sensors 11. Alternatively, dedicated leak paths for use in coupling the transmission cable to the reader as part of the reverse communication linked may be designed; however, such a path may not be optimal from the standpoint of the forward communication link efficiency since such leak path would also effectively radiate energy in the forward communication link that would not couple to and be utilized by any RF sensors 11.

Figure 4:
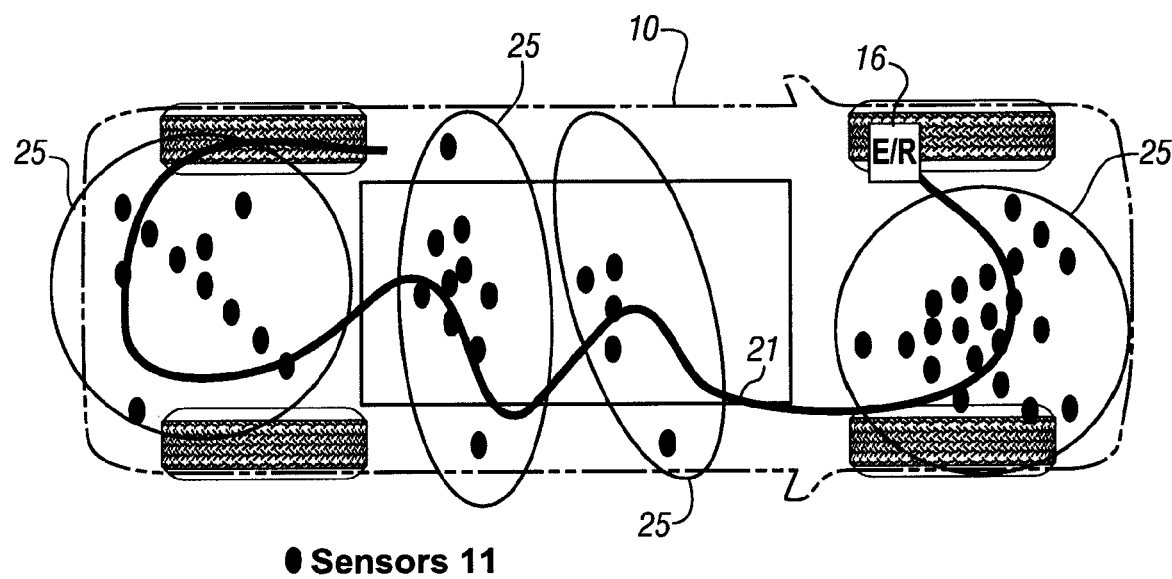
FIG. 4 illustrates a vehicular application of a wireless sensing system employing transmission cables in the communication links including terminated coupling in accordance with the present invention.

With reference now to FIG. 4, another alternate embodiment of a wireless sensor system in accordance with the present invention is illustrated with respect to an exemplary vehicular application. In this embodiment, one or more transmission cables 21 are routed through the vehicle 10 and more particularly and preferably in proximity to regions wherein RF sensors 11 are located. The transmission cables are traveling wave antennas configured with designed leak paths to control radiation characteristics (e.g. locations, magnitudes, cut-off frequencies and patterns). At least one transceiver (E/R) 16 is coupled via physical termination (i.e. electrically coupled) to the transmission cable 21 and effective to both source the transmission cable 21 with RF energy as part of the forward communication link and receive from the transmission cable 21 RF energy as part of the reverse communication link. As in the previously described embodiments using transmission cables, radiated energy is delivered and focused by selectively leaking the energy from the cable at strategic points along the cable (i.e. sensor coupling regions) to adequately energize the plurality of RF sensors 11 in accordance with their respective requirements (e.g. for effecting backscatter, device powering/charging and intelligible interrogation). And, the reverse communication link of the wireless sensing system includes the RF sensors air linked to the one or more transmission cables 21 via the sensor coupling regions. The reverse communication link is then completed through the transmission cables 21 physically terminated at the at least one transceiver (E/R) 16.

Figure 5:
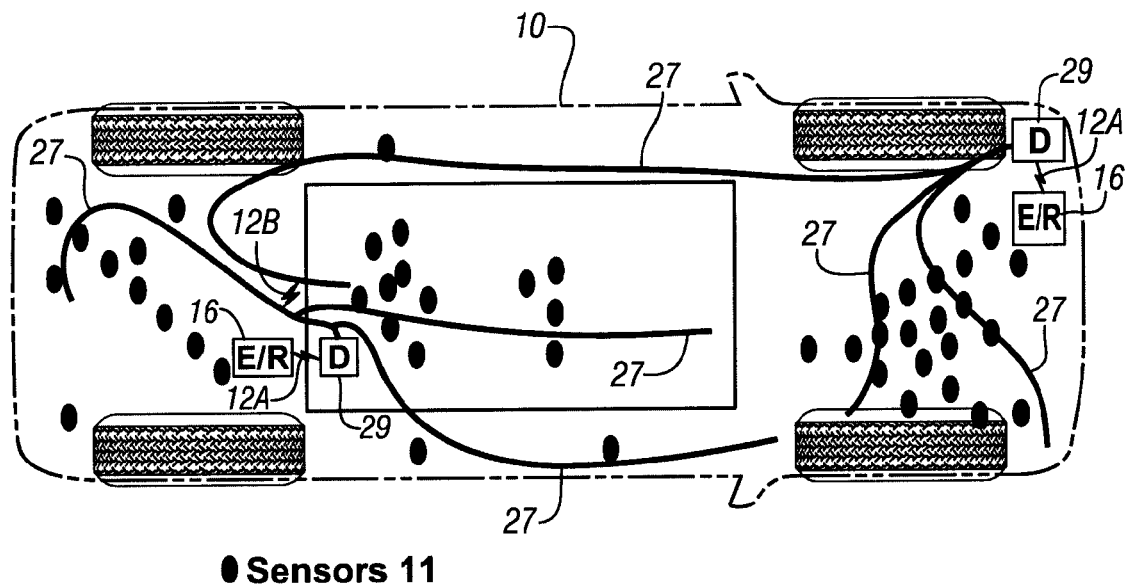
FIG. 5 illustrates a vehicular application of a wireless sensing system employing conventional vehicle wiring conductors in the communication links including near field coupling in accordance with the present invention.

With reference now to FIG. 5, another alternate embodiment of a wireless sensor system in accordance with the present invention is illustrated with respect to an exemplary vehicular application. In this embodiment, the vehicle includes pre-existing, conventional wiring harnesses including individual, elongated conductors 27 for providing power and ground to a variety of devices including controllers, actuators and various electrical loads of the vehicle. Conductors 27 are well distributed throughout the vehicle 10 with some conductors 27 in proximity to regions wherein RF sensors 11 are located. Vehicle 10 also includes one or more wiring distribution centers (D) 29, terminal blocks or equivalent electrical centers whereat multiple conductors and harnesses are consolidated. In accordance with the present embodiment of the invention, a transceiver (E/R) 16 is positioned relative to the wiring distribution center (D) 29 for effective near field coupling via air link 12A to both source the conductors 27 with RF energy as part of the forward communication link and receive from the conductors 27 RF energy as part of the reverse communication link. In the forward communication link, energy is radiated from the conductors 27 and air linked to the plurality of RF sensors 11 for adequate energization in accordance with their respective requirements (e.g. for effecting backscatter, device powering/charging and intelligible interrogation). And, the reverse communication link of the wireless sensing system also includes the RF sensors air linked to the conductors 27 with the remaining reverse communication link accomplished through the conductors 27 and back to the transceiver (E/R) 16 across the near field air link therebetween. Alternatively, the reverse link of the wireless sensing system may take advantage of the sensitivity benefits of readers in general by directly air linking to an independent reader as part of the reverse communication link. Furthermore, the transceiver's energizer and reader and associated functionality may be separated as previously described with respect to other embodiments herein. For example, in an alternate arrangement, an energizer may be associated with one distribution center and a reader associated with another distribution center provided there is adequate signal linking 12B between the two distribution centers via proximal conductors 27. Adequate signal linking can result from conductors associated with each distribution center having common or sufficiently proximal routing through the vehicle, for example. Other alternate arrangements may include various combinations of energizers and readers near field linking to various individual conductors 27 remote from distribution centers. Since the reverse communication link is generally subject to fewer constraints due to the robustness of the readers, such arrangement may be more preferable with respect to reader placement than with respect to energizer placement.

Figure 6:
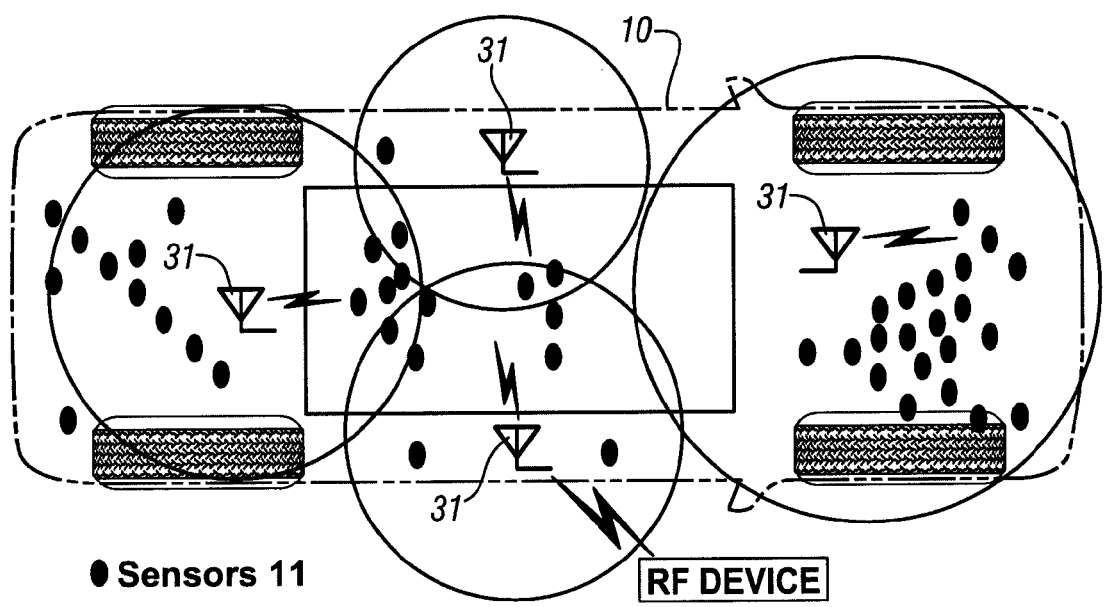
FIG. 6 illustrates a vehicular application of a wireless sensing system employing pre-existing vehicle access and operation control antennas in the sensing communication links in accordance with the present invention.

With reference now to FIG. 6, a vehicle 10 includes a radio frequency access control system having at least one and preferably a plurality of distributed antennas (i.e. antenna array) for effecting interrogation of radio frequency access permission devices for managing vehicle security, operation and accessories. The antennas 31 are strategically located to provide substantially complete peripheral interrogation coverage of the external regions of the vehicle whereat an authorized user may require access, including all doors, deck lids, lift gates or other externally operable passenger, cargo, service, fueling or the like access points. The antenna array is coupled to at least one radio frequency transceiver (not separately illustrated). Such a system provides a radio frequency interrogation signal upon some externally provided request or event (hereafter an interrogation request). Such interrogation requests may be invoked by a door handle or lift gate handle operation, an external touchpad switch activation or capacitive touchpad activation, or a radio frequency signal request such as from a user activated radio frequency transmitting key fob. Such interrogation requests are not alone effective to actuate access point lock hardware, but rather provide a wake-up or request signal for an interrogation event from an on-vehicle access control system controller (not separately shown) interfacing with the transceiver. The on-vehicle access control system remains dormant until such an interrogation request occurrence, whereafter the system invokes an interrogation signal via the transceiver at the distributed antennas 31. The interrogation is a radio frequency signal providing RF energy and/or data signals to an RF access permission device. The transceiver then looks for a response back from an RF access permission device carried on the individual having requested such interrogation via the interrogation request. Such an RF access permission device may be integrated, for example, into a key, a key fob, access card or substantially any object desired. In order to grant access and actuate lock hardware release, the in-vehicle access control system must receive back from the RF access permission device information meeting the security requirements for access, typically an appropriate identification code stored within a memory structure associated with the RF device. Additionally, the antennas 31 provide substantially complete interior interrogation coverage of the passenger compartment. The access control system can then additionally enable operative functionality of the vehicle systems, including keyless push-button starting and accessory operation, in similar fashion. In such a system, the interrogation requests may be invoked by pushing a button, flipping a switch, turning a knob, touch pad entry or similar operator interface with the vehicle (e.g. pushing an engine start button, toggling a power window switch, etc.). Here, again, such interrogation requests are not alone effective to start the engine or actuate the desired accessory function, but rather provide a wake-up or request signal for an interrogation event from an on-vehicle engine controller or accessory control system controller interfacing with the transceiver. These control systems remain dormant until such an interrogation request occurrence, whereafter the system invokes an interrogation signal via the transceiver at the distributed antennas 31. The interrogation includes a radio frequency signal providing RF energy and/or data signals to the RF access permission device and subsequent response back from the RF access permission device carried on the individual having requested such interrogation via the interrogation request. As used herein, vehicle access control includes such exemplary and non-limiting examples of vehicle security, engine operation and accessory functionality.

In accordance with the present invention, such pre-existing access control system radio frequency interrogation antenna array is also utilized for interrogating the plurality of RF sensors 11 within the vehicle 10 and not associated with access control functions, including providing RF energy and/or data signals thereto in the forward communication link, and for receiving reverse communication link data back from the RF sensors 11. In the case of the RF sensors 11, however, there is no dependency upon an interrogation request invoked by the vehicle operator. Instead, interrogation of the sensors 11 occurs in response to system invoked interrogation requests. In other words, an on-vehicle system controller may require updated sensor data from sensors 11 and invokes an interrogation request. The system invokes an interrogation signal via the transceiver at the distributed antennas 31. The interrogation includes a radio frequency signal providing RF energy and/or data signals to the RF sensors 11 and subsequent responses back from the RF sensors 11. Radio frequency traffic from a multiplicity of sensors 11 may be managed to avoid collisions, for example, by various synchronous and asynchronous techniques. Sensors 11 may, for example, be preconfigured with predefined time slots within which they uniquely transmit or be preconfigured with unique identifier codes whereby sensor data transmissions are managed in accordance with these identification codes (e.g. singulation or tree walking techniques).

Figure 7:
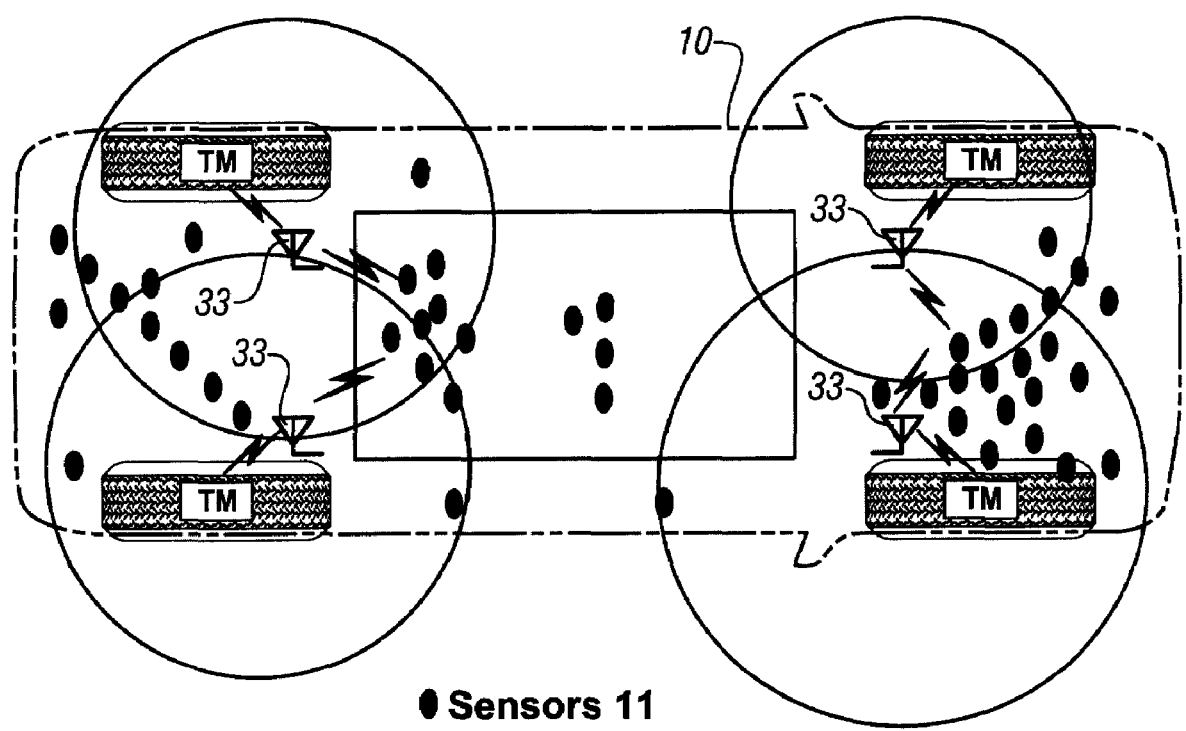
FIG. 7 illustrates a vehicular application of a wireless sensing system employing pre-existing tire pressure monitoring antennas in the sensing communication links in accordance with the present invention.

With reference now to FIG. 7, a vehicle 10 includes a radio frequency tire monitor system having a plurality of antennas 33 distributed in proximity to and associated with each vehicle corner for effecting interrogation of radio frequency tire monitor (TM) devices associated with each respective vehicle tire. Such antenna locations are adaptable to provide substantial vehicle interrogation coverage of the fore and aft regions of the vehicle, including engine compartments, powertrain systems, fuel systems and suspension/chassis systems, whereat significant sensing operations are carried out. The TM antenna array is coupled to at least one radio frequency transceiver not separately illustrated. Such a system uses the TM antenna array to receive information (e.g. tire pressure or temperature or other parameters) from the RF TM device embedded or associated with the tire, wheel and/or tire value stem. Such a RF TM devices are generally operative to transmit in a self-invoked fashion. That is to say, each RF TM device will transmit based on predefined events that are determined by the RF TM devices. These predefined events may include, for example, wheel speed (e.g. as sensed by a centrifugal switch) or low/high tire pressure (as sensed by pressure switches or pressure transducers). Alternatively, such predefined events may wirelessly transmit an interrogation request which triggers the interrogation of the RF TM devices in a fashion analogous to the radio frequency signal request from a user activated radio frequency transmitting key fob in an access control system as described herein above. The system may further operate to avoid collisions among the various RF TM devices through various synchronous and asynchronous techniques.

In accordance with the present invention, such pre-existing radio frequency TM antenna array is also utilized for interrogating the plurality of RF sensors 11 within the vehicle 10 and not associated with tire monitoring functions, including providing RF energy and/or data signals thereto in the forward communication link, and for receiving reverse communication link data back from the RF sensors 11. In the case of the RF sensors 11, however, system invoked interrogations are employed. In other words, an on-vehicle system controller may require updated sensor data from sensors 11 and invokes an interrogation request. The system invokes an interrogation signal via the transceiver at the distributed antennas 31. The interrogation includes a radio frequency signal providing RF energy and/or data signals to the RF sensors 11 and subsequent responses back from the RF sensors 11. Here, as in the other examples where multiple RF sensors or devices are transmitting, data collision is avoided, for example, by various synchronous and asynchronous techniques.

For the embodiments shown in both FIGS. 6 and 7, a communication mechanism is required to manage the transmission of the different subsystems to ensure that the respective systems do not interfere with each others' operations. Several methods could be deployed to accomplish this, including using synchronous communication techniques and restricting various components of the different subsystems to allotted time intervals for the purposes of communicating. The time slots could further be dynamically assigned based on vehicle state. For example, many sensors and switches do not have to communicate during periods when the vehicle ignition is in the off state. The communication time slots could be devote to the other subsystem(s) for the purposes of increasing detection probability. Asynchronous communication techniques could also be used including, for example, frequency and code spreading methods. With asynchronous techniques the various systems would manage the communication channel by spreading their information in frequency or code in order to avoid interfering with other subsystems.

The invention has been described with specific reference to the preferred embodiments and modifications thereto. Further modifications and alterations may occur to others upon reading and understanding the specification. It is intended to include all such modifications and alterations insofar as they come within the scope of the invention.

The invention claimed is:

1. Wireless vehicular sensing system comprising:
    a radio frequency access control system including a plurality of antennas distributed within the vehicle and at least one radio frequency transceiver coupled to said plurality of antennas for effecting radio frequency interrogations of radio frequency access permission devices via said plurality of antennas in response to operator invoked interrogation requests; and
    a plurality of radio frequency sensors distributed within the vehicle and associated with systems other than vehicle access control;
    said at least one radio frequency transceiver effecting radio frequency interrogations of said plurality of radio frequency sensors via said plurality of antennas in response to system invoked interrogation requests;
    each of the antennas comprising a leaky waveguide antenna including an elongated conductor for providing one of electric power and electric ground to a device electrically connected to a wiring distribution center in the vehicle; and
    the at least one radio frequency transceiver positioned proximal to the wiring distribution center to effect near-field coupling via air link to source the conductors with radio frequency energy and receive from the conductors radio frequency energy.

2. The wireless vehicular sensing system as claimed in claim 1 wherein the plurality of radio frequency sensors transmit within predefined time slots in response to radio frequency interrogations.

3. The wireless vehicular sensing system as claimed in claim 1 wherein the plurality of radio frequency sensors transmit in accordance with unique identifier codes in response to radio frequency interrogations.

4. Wireless vehicular sensing system comprising:
a radio frequency transceiver;
a plurality of antennas electrically connected to a wiring distribution center that is positioned for near-field coupling via an air link to the radio frequency transceiver, each of the antennas comprising a leaky waveguide antenna including an elongated conductor for providing one of electric power and electric ground to a device electrically connected to the wiring distribution center in the vehicle, the radio frequency transceiver sourcing the conductors with radio frequency energy and receiving from the conductors radio frequency energy;
a radio frequency access permission device including a radio frequency transponder; and
a radio frequency sensor including a radio frequency transponder;
said radio frequency transceiver interrogating said radio frequency access permission device in response to an operator invoked interrogation request;
said radio frequency transceiver interrogating said radio frequency sensor in response to system invoked interrogation requests.

5. The wireless vehicular sensing system as claimed in claim 4 wherein the radio frequency sensor transmits within predefined time slots in response to radio frequency interrogations.

6. The wireless vehicular sensing system as claimed in claim 4 wherein the radio frequency sensor transmits in accordance with a unique identifier code in response to radio frequency interrogations.

7. Wireless vehicular sensing system comprising:
a radio frequency transceiver;
a plurality of antennas coupled to the radio frequency transceiver, each of the antennas comprising a leaky waveguide antenna including an elongated conductor for providing one of electric power and electric ground to a device electrically connected to a wiring distribution center in the vehicle and the radio frequency transceiver is positioned relative to the wiring distribution center for near-field coupling via an air link to source the conductors with radio frequency energy and receive from the conductors radio frequency energy;
a first radio frequency sensor transmitting data upon predefined events determined by the first radio frequency sensor; and
a second radio frequency sensor including a radio frequency transponder;
said radio frequency transceiver receiving radio frequency transmissions from said first radio frequency sensor;
said radio frequency transceiver interrogating said second radio frequency sensor in response to system invoked interrogation requests.

8. The wireless vehicular sensing system as claimed in claim 7 wherein said first radio frequency sensor comprises a tire monitor device.

9. The wireless vehicular sensing system as claimed in claim 8 wherein said predefined events comprise vehicle speed.

10. The wireless vehicular sensing system as claimed in claim 8 wherein said predetermined events comprise tire pressure crossing a predetermined pressure threshold.

11. The wireless vehicular sensing system as claimed in claim 7 wherein the second radio frequency sensor transmits within predefined time slots in response to radio frequency interrogations.

12. The wireless vehicular sensing system as claimed in claim 7 wherein the second radio frequency sensor transmits in accordance with a unique identifier code in response to radio frequency interrogations.

13. Wireless vehicular sensing system comprising:
a radio frequency tire monitoring system including a plurality of antennas distributed within the vehicle and at least one radio frequency transceiver coupled to said plurality of antennas for effecting radio frequency interrogations of tire monitor devices via said plurality of antennas in response to tire monitor device invoked interrogation requests, each of the antennas comprising a leaky waveguide antenna including an elongated conductor for providing one of electric power and electric ground to a device electrically connected to a wiring distribution center in the vehicle, the radio frequency transceiver positioned relative to the wiring distribution center for near-field coupling via air link to source the conductors with radio frequency energy and receive from the conductors radio frequency energy; and
a plurality of radio frequency sensors distributed within the vehicle and associated with systems other than tire monitoring;
said at least one radio frequency transceiver effecting radio frequency interrogations of said plurality of radio frequency sensors via said plurality of antennas in response to system invoked interrogation requests.

14. The wireless vehicular sensing system as claimed in claim 13 wherein the radio frequency sensor transmits within predefined time slots in response to radio frequency interrogations.

15. The wireless vehicular sensing system as claimed in claim 13 wherein the radio frequency sensor transmits in accordance with a unique identifier codes in response to radio frequency interrogations.

16. The wireless vehicular sensing system as claimed in claim 13, wherein an energizer of the radio frequency transceiver generates a single-lobed radiation pattern.

17. The wireless vehicular sensing system as claimed in claim 16, further comprising the energizer located at a vehicle corner to provide forward communication link coverage within the vehicle and attenuated forward communication link radiation external to the vehicle.

18. The wireless vehicular sensing system as claimed in claim 13, wherein an energizer of the radio frequency transceiver generates an omni-directional radiation pattern.

19. The wireless vehicular sensing system as claimed in claim 13, wherein an energizer of the radio frequency transceiver generates a dual-lobed radiation pattern aligned longitudinally to a center-line of the vehicle.

* * * * *